US012393707B2

(12) United States Patent
Grant (10) Patent No.: US 12,393,707 B2
(45) Date of Patent: Aug. 19, 2025

(54) PERSONA PREDICTION FOR ACCESS TO RESOURCES

(71) Applicant: Deere & Co., Moline, IL (US)

(72) Inventor: Elliott Grant, Woodside, CA (US)

(73) Assignee: Deere & Co., Moline, IL (US)

( * ) Notice: Subject to any disclaimer, the term of this patent is extended or adjusted under 35 U.S.C. 154(b) by 563 days.

(21) Appl. No.: 17/535,457

(22) Filed: Nov. 24, 2021

(65) Prior Publication Data

US 2023/0161890 A1     May 25, 2023

(51) Int. Cl.
*G06F 21/62*     (2013.01)
*G06F 16/29*     (2019.01)
*G06N 20/00*     (2019.01)

(52) U.S. Cl.
CPC .............. *G06F 21/62* (2013.01); *G06F 16/29* (2019.01); *G06N 20/00* (2019.01); *G06F 2221/2111* (2013.01)

(58) Field of Classification Search
CPC ... H04L 12/1845; H04L 63/107; H04L 67/52; H04L 63/1408; H04L 67/02; H04L 63/102; H04L 67/535; H04N 21/25841; G06Q 20/14; G06Q 30/06; G06Q 30/0601; G06Q 30/0205; G06V 30/224; G06F 3/0482; G06F 13/4282; G01S 5/0072; H04W 4/025; H04W 4/029; G06N 3/02; G06N 20/00; G01C 21/206
See application file for complete search history.

(56) References Cited

U.S. PATENT DOCUMENTS

| | | | |
|---|---|---|---|
| 9,578,025 B2 | 2/2017 | Pinski et al. | |
| 10,371,542 B2 | 8/2019 | O'Herlihy et al. | |
| 2005/0091532 A1* | 4/2005 | Moghe | H04L 63/1408 713/168 |
| 2009/0231190 A1* | 9/2009 | Grumbles | G01S 5/0072 342/357.57 |
| 2011/0029398 A1* | 2/2011 | Boudville | G06Q 30/0601 705/26.1 |
| 2011/0055915 A1* | 3/2011 | Hall | H04L 67/52 726/12 |
| 2012/0203663 A1* | 8/2012 | Sinclair | G06Q 30/06 713/168 |
| 2012/0246098 A1* | 9/2012 | Chari | G06N 20/00 706/12 |
| 2014/0351175 A1* | 11/2014 | Venkat | H04W 4/029 706/46 |

(Continued)

*Primary Examiner* — Dustin Nguyen
(74) *Attorney, Agent, or Firm* — HANLEY, FLIGHT & ZIMMERMAN, LLC (57) ABSTRACT

Techniques are described herein for determining whether a particular user is authorized to access data, corresponding to a particular field, in a farmland database. A method includes: receiving a location history corresponding to a user, the location history including historical location data that indicate, for each time of a plurality of times, a location of the user at the time; applying the historical location data as inputs across a trained machine learning model to predict a persona corresponding to the user; receiving, from the user, a request to access data; in response to receiving the request to access the data, determining that the request is authorized based on the predicted persona corresponding to the user; and in response to determining that the request is authorized, providing access to the data.

22 Claims, 5 Drawing Sheets

(56) References Cited

U.S. PATENT DOCUMENTS

| | | | |
|---|---|---|---|
| 2015/0186535 A1* | 7/2015 | Patil | G06F 3/0482 707/710 |
| 2015/0234767 A1* | 8/2015 | Tatge | G06F 13/4282 710/306 |
| 2015/0278838 A1* | 10/2015 | Rasa | G06Q 30/0205 705/7.34 |
| 2016/0105435 A1* | 4/2016 | Turner | H04L 63/107 726/7 |
| 2017/0024739 A1* | 1/2017 | Todasco | G06Q 20/14 |
| 2017/0323340 A1* | 11/2017 | Jeon | H04L 67/02 |
| 2018/0276710 A1 | 9/2018 | Tietzen et al. | |
| 2019/0012441 A1* | 1/2019 | Tuli | G06N 3/02 |
| 2019/0044951 A1* | 2/2019 | Zivkovic | H04L 67/535 |
| 2019/0171171 A1* | 6/2019 | Verteletskyi | G01C 21/206 |
| 2019/0279287 A1* | 9/2019 | Oliver | G06V 30/224 |
| 2019/0373297 A1* | 12/2019 | Sarkhel | H04N 21/25841 |
| 2020/0036802 A1* | 1/2020 | Bullock | G06N 20/00 |
| 2020/0204944 A1* | 6/2020 | Tippery | H04L 12/1845 |
| 2020/0412726 A1* | 12/2020 | Nevatia | H04L 63/102 |
| 2021/0194908 A1* | 6/2021 | Wu | H04L 63/1408 |
| 2023/0379659 A1* | 11/2023 | Belt | H04W 4/025 |

* cited by examiner

PERSONA PREDICTION FOR ACCESS TO RESOURCES

BACKGROUND

Agricultural entities such as individual farmers, agricultural cooperatives, and agricultural companies may periodically investigate farmland for a variety of purposes. For example, a farmer may wish to determine whether a particular crop field is a good candidate for expansion (e.g., acquisition, leasing, etc.). However, this can be a daunting task. There may be countless crop fields available, each with its own unique characteristics and/or history of stewardship. Moreover, a particular crop field's suitability to grow a particular variety of a crop—which may be manifested as an expected crop yield in some cases—is dependent on myriad factors. These factors may include, but are not limited to, climate, soil composition, prevalence of plant disease (e.g., pests, fungus, etc.) and/or weeds in the area, and so forth. Farmland may be investigated for other purposes as well. For example, farmland valuation and/or crop insurance evaluation may involve quantifying risk of crop loss due to factors such as flood, drought, etc.

A farmland database may be used by agricultural entities to store, edit, and retrieve various information about farmland, including field boundaries, climate, soil composition, prevalence of plant disease (e.g., pests, fungus, etc.) and/or weeds in the area, and/or any other characteristics. Additionally, such a database may be used by agricultural entities to store, edit, and retrieve observational crop data obtained by farm machinery. For example, some tractors and harvesters are configured to automatically collect and log various data, such as digital images of crops, where they were operated (e.g., using position coordinate data), etc. In some cases, tractor-generated and harvester-generated data associated with a field may be uploaded by one or more tractors and harvesters (e.g., in real time or during downtime) to a database that is a central repository of tractor-generated and harvester-generated data. Agricultural entities may utilize this data for various purposes (e.g., to analyze crop yields, determine whether a particular crop field is a good candidate for expansion, etc.).

SUMMARY

Techniques described herein relate to determining whether a particular user is authorized to access data, corresponding to a particular field, in a farmland database. In various implementations, one or more machine learning models may be trained to generate output that is indicative, for instance, of a predicted persona (e.g., farm owner, tenant, sprayer, crop advisor, etc.) of a user. Inputs to such a model may include a location history corresponding to a user, the location history including historical location data that indicate, for each time of a plurality of times, a location of the user at the time. In some implementations, historical location data, frequency of visits, and focus of visits may be used as a proof-of-work type of authentication to determine a likelihood of the user being an owner or tenant of the field. Based on the predicted persona/determined likelihood, implementations determine whether or not to provide access (e.g., to view or edit) to the data, associated with the particular field, in the farmland database.

In some implementations, users are able to authenticate roles/personas using a proof-of-work type of authentication. For example, machine learning models, heuristics, or other algorithms may be used to determine whether a user has spent sufficient time working in a selected field (e.g., operating a tractor, combine, scouting, etc.), to be a likely owner or tenant of the selected field, based on historical location data (e.g., provided by a mobile phone or other mobile device of the user) and, in some implementations, avoiding the need to upload equipment data (e.g., as planted data). Accordingly, implementations may authenticate roles/personas both for users/growers who use logging equipment as well as users/growers who do not use logging equipment (e.g., growers of specialty crops). Other data, such as frequency of visits and focus of visits, may also be utilized to determine a likelihood of a user being an owner or tenant of a field. Additionally, if a user claims a field for which they are not an owner or tenant, the actual owner/tenant may contest the other user's claimed owner/tenant role by providing their own location history, which may be used to confirm their role as owner or tenant.

In various implementations, a location history corresponding to a user is received, the location history including historical location data that indicate, for each time of a plurality of times, a location of the user at the time; the historical location data is applied as inputs across a trained machine learning model to predict a persona corresponding to the user; a request to access data is received from the user; in response to receiving the request to access the data, that the request is determined to be authorized based on the predicted persona corresponding to the user; and in response to determining that the request is authorized, access is provided to the data.

In some implementations, all of the locations in the historical location data are within agricultural areas. In some implementations, the historical location data is filtered to remove locations outside of agricultural areas prior to applying the historical location data as inputs across the trained machine learning model.

In some implementations, the predicted persona is an owner or tenant of a field. In some implementations, the request to access data includes a request to edit data corresponding to the field in a farmland database.

In some implementations, an additional location history corresponding to an additional user is received, the additional location history including additional historical location data that indicate, for each time of a plurality of times, a location of the additional user at the time; and the additional historical location data is applied as the inputs across the trained machine learning model to predict a persona corresponding to the additional user. In some implementations, an additional request is received, from the additional user, to access the data; in response to receiving the additional request to access the data, a determination is made to deny the additional request based on the predicted persona corresponding to the additional user; and in response to determining that the additional request is denied, providing access to the data is declined.

In some additional or alternative implementations, a location history corresponding to a user is received, the location history including historical location data that indicate, for each time of a plurality of times, a location of the user at the time; a probability of the user being an owner or tenant of a field is determined based on the historical location data; a request to access data is received, from the user; in response to receiving the request to access the data, the request is determined to be authorized based on the probability of the user being the owner or the tenant satisfying a threshold; and in response to determining that the request is authorized, access to the data is provided.

In some implementations, all of the locations in the historical location data are within agricultural areas. In some implementations, the historical location data is filtered to remove locations outside of agricultural areas prior to determining the probability of the user being the owner or the tenant of the field based on the historical location data. In some implementations, the request to access data includes a request to edit data corresponding to the field in a farmland database.

In some implementations, an additional location history corresponding to an additional user is received, the additional location history including additional historical location data that indicate, for each time of a plurality of times, a location of the additional user at the time; and a probability of the additional user being the owner or the tenant of the field is determined based on the additional historical location data. In some implementations, an additional request to access the data is received, from the additional user; and in response to receiving the additional request to access the data, the additional request is determined to be denied based on the probability of the additional user being the owner or the tenant not satisfying the threshold.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
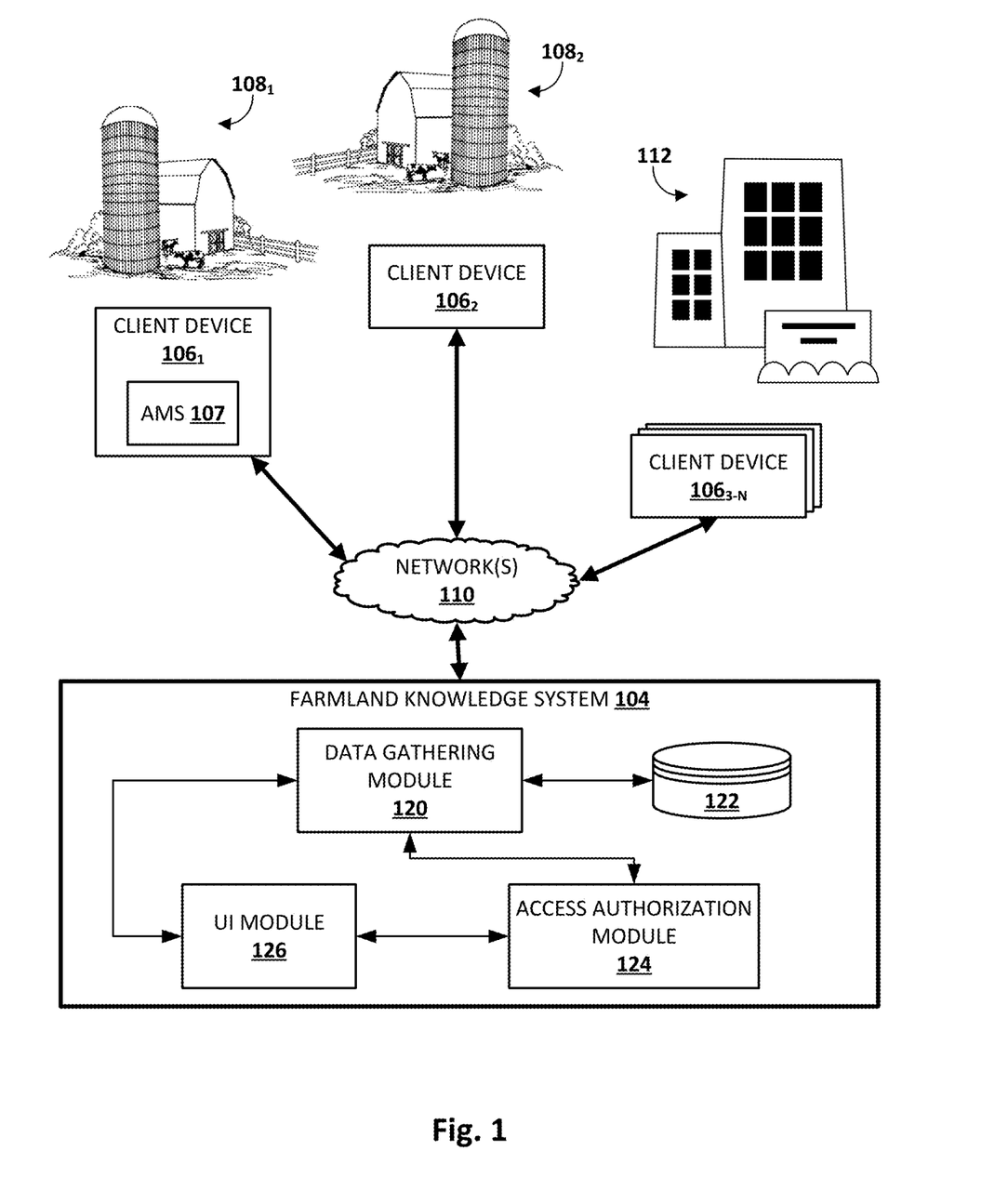
FIG. 1 depicts an example environment in which selected aspects of the present disclosure may be implemented, in accordance with various implementations.

FIG. 1 depicts an example environment 100 in which one or more selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Various components in the environment 100 are in communication with each other over one or more networks 110. Network(s) 110 may take various forms, such as one or more local or wide area networks (e.g., the Internet), one or more personal area networks (PANs), one or more mesh networks (e.g., ZigBee, Z-Wave), etc.

An individual (who in the current context may also be referred to as a "user") associated with an agricultural entity may operate one or more client devices $106_{1-N}$ to interact with other components depicted in FIG. 1. A client device 106 may be, for example, a mobile phone computing device that includes a location capability (e.g., the client device 106 may be able to determine a global positioning system or GPS location). In other implementations, a client device 106 may be, for example, a computing device of a vehicle of the user/agricultural entity (e.g., an in-vehicle communications system, navigation system, entertainment system, or any other computing device integrated into or mounted on a farm vehicle such as a tractor or harvester), a tablet computing device, a laptop computing device, a desktop computing device, a standalone interactive speaker (with or without a display), or a wearable apparatus that includes a computing device, such as a head-mounted display (HMD) that provides an augmented reality (AR) or virtual reality (VR) immersive computing experience, a "smart" watch, and so forth, and may include a location capability.

Farmland knowledge system 104 is an example of an information system in which the techniques described herein may be implemented. Each of client devices 106 and farmland knowledge system 104 may include one or more memories for storage of data and software applications, one or more processors for accessing data and executing applications, and other components that facilitate communication over a network. The operations performed by client device 106 and/or farmland knowledge system 104 may be distributed across multiple computer systems. Some of the systems depicted in FIG. 1, such as the farmland knowledge system 104, may be implemented using one or more server computing devices that form what is sometimes referred to as a "cloud infrastructure," although this is not required.

In FIG. 1, first client device $106_1$ is associated with (e.g., controlled and/or maintained by) a first agricultural entity in the form of a first farm $108_1$. Similarly, a second client device $106_2$ is associated with a second agricultural entity in the form of a second farm $108_2$. One or more additional client devices $106_{3-N}$ are associated with another agricultural entity that takes the form of an organization 112 such as a commercial entity, a farming cooperative or "co-op", a governmental agency or department, etc. The environment 100 depicted in FIG. 1, including the particular arrangement of agricultural entities and client devices that is depicted, is not meant to be limiting. Individual farms may be associated with multiple client devices, for instance.

Although not shown in FIG. 1, in various implementations, various devices may be deployed at each farm to, for instance, capture agricultural data at the farm. This agricultural data may include, but is not limited to, climate features, edaphic features, landform features, and so forth. These devices may include, but are not limited to, manned and/or unmanned aerial vehicles, farming equipment that is autonomous, driven by a person or towed by another vehicle, in-situ sensors such as weather stations, soil moisture monitors, etc.

In some implementations, the client devices 106 may passively capture location data but may not be used to run or access applications that perform agricultural tasks. In other implementations, the client devices 106 may operate a variety of different applications that may be used to perform various agricultural tasks, such as crop yield prediction and diagnosis, field searching, field-level crop management, plant-level phenotyping, etc. For example, first client device $106_1$ operates agricultural management software (AMS) 107 (e.g., which may be standalone or part of another application, such as part of a web browser). Other client devices 106 may operate similar applications.

In various implementations, farmland knowledge system 104 may be implemented across one or more computing systems that may be referred to as the "cloud". Farmland knowledge system 104 may include various components that, alone or in combination, perform selected aspects of the present disclosure. For example, in FIG. 1, farmland knowledge system 104 includes a data gathering module 120, a raw agricultural data index 122, an access authorization module 124, and a user interface (UI) module 126. One or more of these modules may be omitted and/or combined with other modules, and may be implemented using any combination of hardware and software. In this specification, the term "database" and "index" will be used broadly to refer to any collection of data. The data of the database and/or the index does not need to be structured in any particular way and it can be stored on storage devices in one or more geographic locations.

Data gathering module 120 may be configured to gather, collect, request, obtain, and/or retrieve raw agricultural data from a variety of different sources, such as agricultural personnel, robot(s), aerial drones, satellite imagery, and so forth. Data gathering module 120 may store that raw agricultural data in raw agricultural data index 122. This agricultural data may be associated with individual agricultural fields, and may include various types of information (i.e. "features") about each agricultural field, such as climate features, edaphic features, landform features, and so forth. Climate features may include, for instance, precipitation levels/frequencies, temperatures, sunlight exposure, wind, humidity, plant disease, evapotranspiration (the sum of evaporation from the land surface plus transpiration from plants), and so forth. Edaphic features may include various information about soil, such as soil composition, soil pH, soil moisture, fraction data, soil organic carbon content, etc. Landform features may include, for instance, elevation, slope, distance to water, etc. In general, any type of data that has any influence on crop growth in an agricultural field ("agriculturally relevant") may be gathered by data gathering module 120 and stored in index 122.

In various implementations, data gathering module 120 may also be configured to gather, collect, request, obtain, and/or retrieve location history data corresponding to one or more users. The location history data may be received from one or more client devices 106 and may include historical location data that indicate, for each time of a plurality of times, a location (e.g., global positioning system or GPS location) of corresponding client device 106 (and/or a location of the user thereof) at the time.

Access authorization module 124 may be configured to analyze location history data that is gathered, collected, requested, obtained, and/or retrieved by data gathering module 120. In various implementations, access authorization module 124 may analyze the location history data associated with a particular user to predict a persona corresponding to the user. In various implementations, access authorization module 124 may also be configured to determine whether or not to authorize a request to access data based on the predicted persona corresponding to the user.

UI module 126 may provide an interface through which applications such as AMS 107 may interface with farmland knowledge system 104 in order to implement selected aspects of the present disclosure. As one non-limiting example, UI module 126 may generate and/or distribute scripts, executable files, and/or interactive documents written in markup languages such as hypertext markup language (HTML) and/or extensible markup language (XML) (e.g., "web pages"). A user associated with an agricultural entity may operate an application on a client device 106 such as a web browser (not depicted) or AMS 107 to interact with these items. Additionally or alternatively, in some implementations, UI module 126 may provide an application programming interface (API) to which AMS 107 may connect. In some such implementations, AMS 107 may render its own GUI based on data exchanged with UI module 126.

UI module 126 may be configured to render, or cause a client device 106 to render, as part of a GUI, a map of a geographic area containing a plurality of agricultural fields. In some implementations, the map rendered/provided by UI module 126 may take the form of satellite imagery that depicts the geographic area from a high elevation. In other implementations the map of the geographic area may be rendered using raster (bitmap) or vector graphics. In either case, UI module 126 may annotate the plurality of agricultural fields visually on an individual agricultural field-basis to convey one or more properties. For example, all agricultural fields having a particular attribute value for one or more properties may be colored or pattern-filled uniformly.

In various implementations, a user may operate a client device 106 (e.g., via AMS 107) to access particular data in the farmland knowledge system 104. For example, a user may operate a client device 106 via AMS 107 to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104. In some implementations, prior to providing the user with access to the particular data, the access authorization module 124 and/or the data gathering module 120 of the farmland knowledge system 104 may request, from the client device 106, a location history corresponding to the user, the location history including historical location data that indicate, for each time of a plurality of times, a location of the user at the time. In some implementations, in response to receiving the request for the location history at the client device 106, AMS 107 on the client device 106 may cause a prompt to be presented to the user, requesting that the user accept or deny the request to provide, to the farmland knowledge system 104, the location history corresponding to the user. In response to the user accepting the request to provide the location history, AMS 107 on the client device 106 may provide the location history corresponding to the user to the farmland knowledge system 104.

In various implementations, the access authorization module 124 and/or the data gathering module 120 of the farmland knowledge system 104 may receive the location history provided by AMS 107 on the client device 106. The access authorization module 124 may then apply the historical location data as inputs across a trained machine learning model to predict a persona corresponding to the user (e.g., owner, tenant, consultant, applicator, etc.), with respect to a particular area of farmland. The machine learning model may have been trained on a plurality of sets of historical location data (e.g., including location data covering a two year period), each labeled to indicate a corresponding persona. The training data may reflect typical movement patterns for individuals associated with various personas (e.g., methodical movement up and down each of the rows of a field by a tenant, occasional movement through a plurality of fields by a sprayer, etc.).

In various implementations, the access authorization module 124 may receive, from the user, a request to access data corresponding to a particular area of farmland in the farmland knowledge system 104. For example, the user may operate a client device 106 via AMS 107 to store, edit, and/or retrieve various information about a particular area of farmland, including field boundaries, climate, soil composition, prevalence of plant disease (e.g., pests, fungus, etc.) and/or weeds in the area, and/or any other characteristics, maintained in the farmland knowledge system 104.

In various implementations, in response to the request to access data corresponding to a particular area of farmland in the farmland knowledge system 104 (e.g., in response to the user operating a client device 106 via AMS 107 to request to store, edit, and/or retrieve various information about a particular area of farmland), the access authorization module 124 may determine whether or not to authorize the request, permitting the access to the data, based on the predicted persona corresponding to the user, with respect to the particular area of farmland. For example, a request to store, edit, and/or retrieve various information about a particular area of farmland by a user who is determined to be an owner or tenant of that particular area of farmland may be authorized by the access authorization module 124, while a request to store, edit, and/or retrieve various information about a particular area of farmland by a user who is determined to be an applicator/sprayer with regard to that particular area of farmland may be denied by the access authorization module 124.

In various implementations, in response to determining that the request to access the data is to be authorized, the access authorization module 124 may cause the farmland knowledge system 104 to process the request to access the data and provide, to AMS 107 on the client device 106, a response to the request. For example, the access authorization module 124 may cause the farmland knowledge system 104 to store, edit, and/or retrieve various information about a particular area of farmland, as requested by the user via AMS 107 of the client device 106. On the other hand, in response to determining that the request to access the data is to be denied, the access authorization module 124 may cause the farmland knowledge system 104 to avoid processing the request to access the data and provide, to AMS 107 on the client device 106, a response indicating that the user is not authorized to access the data. For example, the access authorization module 124 may cause the farmland knowledge system 104 to avoid storing, editing, and/or retrieving various information about a particular area of farmland and instead provide a response indicating that the user is not permitted to store, edit, and/or retrieve various information about the particular area of farmland.

Figure 2:
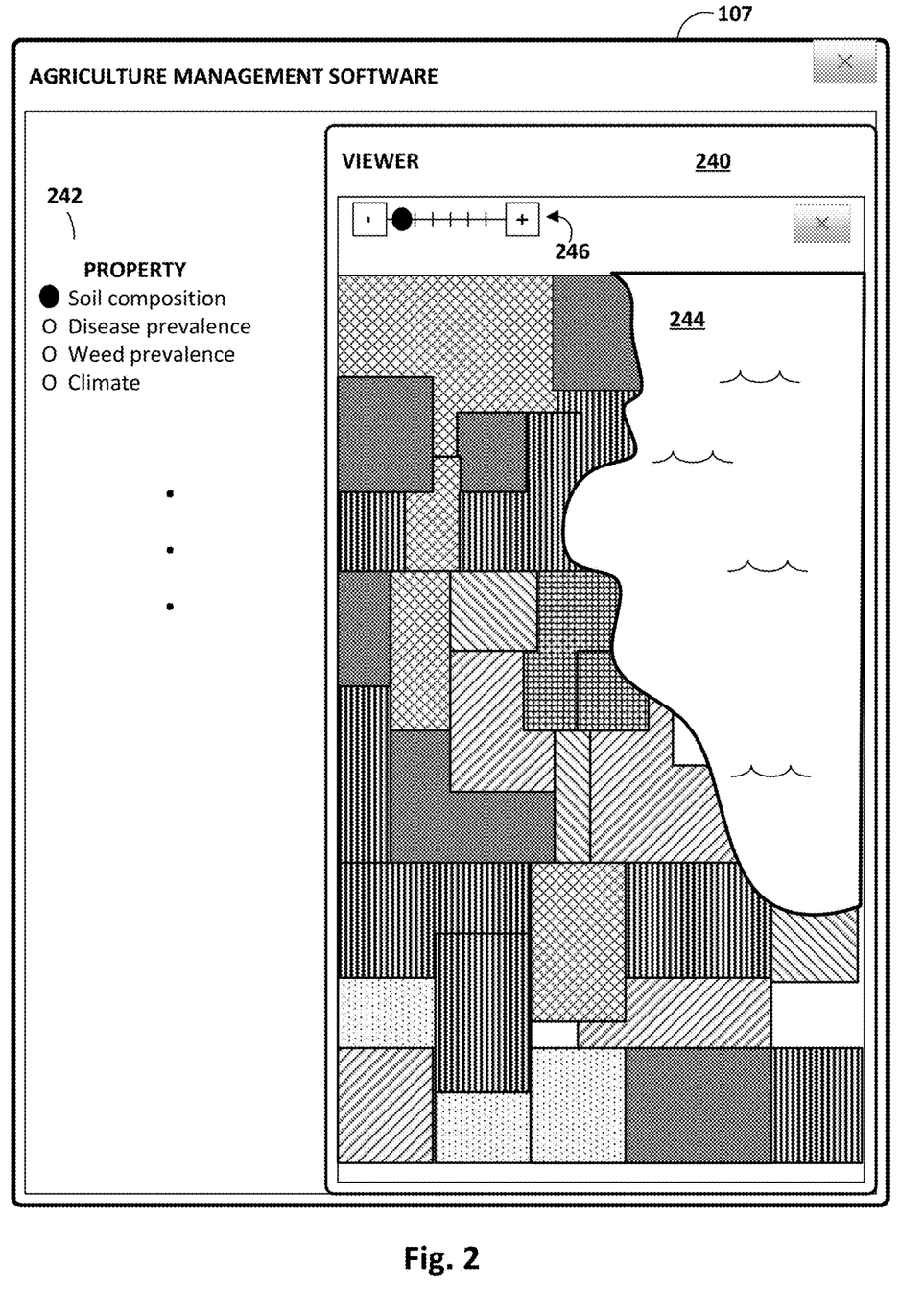
FIG. 2 depicts an example graphical user interface (GUI) that is rendered in accordance with selected aspects of the present disclosure, in accordance with various implementations.

FIG. 2 depicts one example of a GUI that may be rendered by AMS 107 in cooperation with UI module 126, in accordance with various implementations. The GUI includes a viewer 240, a property selector 242, and a zoom adjustment element 246. Property selector 242 is depicted as a set of radio buttons and zoom adjustment element 246 is depicted as a slider, but this is not meant to be limiting. Property selector 242 and zoom adjustment element 246 may take other forms, such as check boxes (e.g., to apply/remove filters), text inputs, sliders, radio buttons, etc.

Viewer 240 currently is rendering an overhead view of a geographic region that includes numerous individual agricultural fields (demarcated by the polygons of various shapes) and a body of water 244. While the agricultural fields are largely rectangular, this is not meant to be limiting, and agricultural fields can (and often do) take any geometric shape, including any polygon shape, ovular, circular, triangular, etc. In FIG. 2, distinct fill patterns signify values/attributes of a property selected by the property selector 242 (each fill pattern signifying a different value/attribute of the selected property, e.g., soil type). While different values/attributes are demarcated in FIG. 2 using different fill patterns, other types of visual annotations, such as color fills having various levels of transparency, may be used in addition to or instead of fill patterns.

In some implementations, AMS 107 and/or UI module 126 may be configured to generate and present additional visual annotations in association with various agricultural fields, in addition to or instead of the colors or fill patterns described previously. For example, a user may wish to understand the soil composition of various agricultural fields, or other properties of various areas of farmland. The additional visual annotation(s) therefore may be generated to convey one or more properties associated with various areas of farmland.

These additional visual annotations may be textual and/or non-textual. In some implementations, these additional annotations may be presented to a user (e.g., of AMS 107) when they somehow interact with various areas of farmland, such as by clicking on an individual agricultural field, operating a pointing device such as a mouse to hover a graphical element such as a cursor over an individual field, etc. The additional visual annotation may be presented in various locations, such as in a pop-up window (e.g., over viewer 240 or elsewhere on the GUI), on a separate portion of the GUI from an overhead view, as text the overlays an overhead view of agricultural fields, etc.

Figure 3:
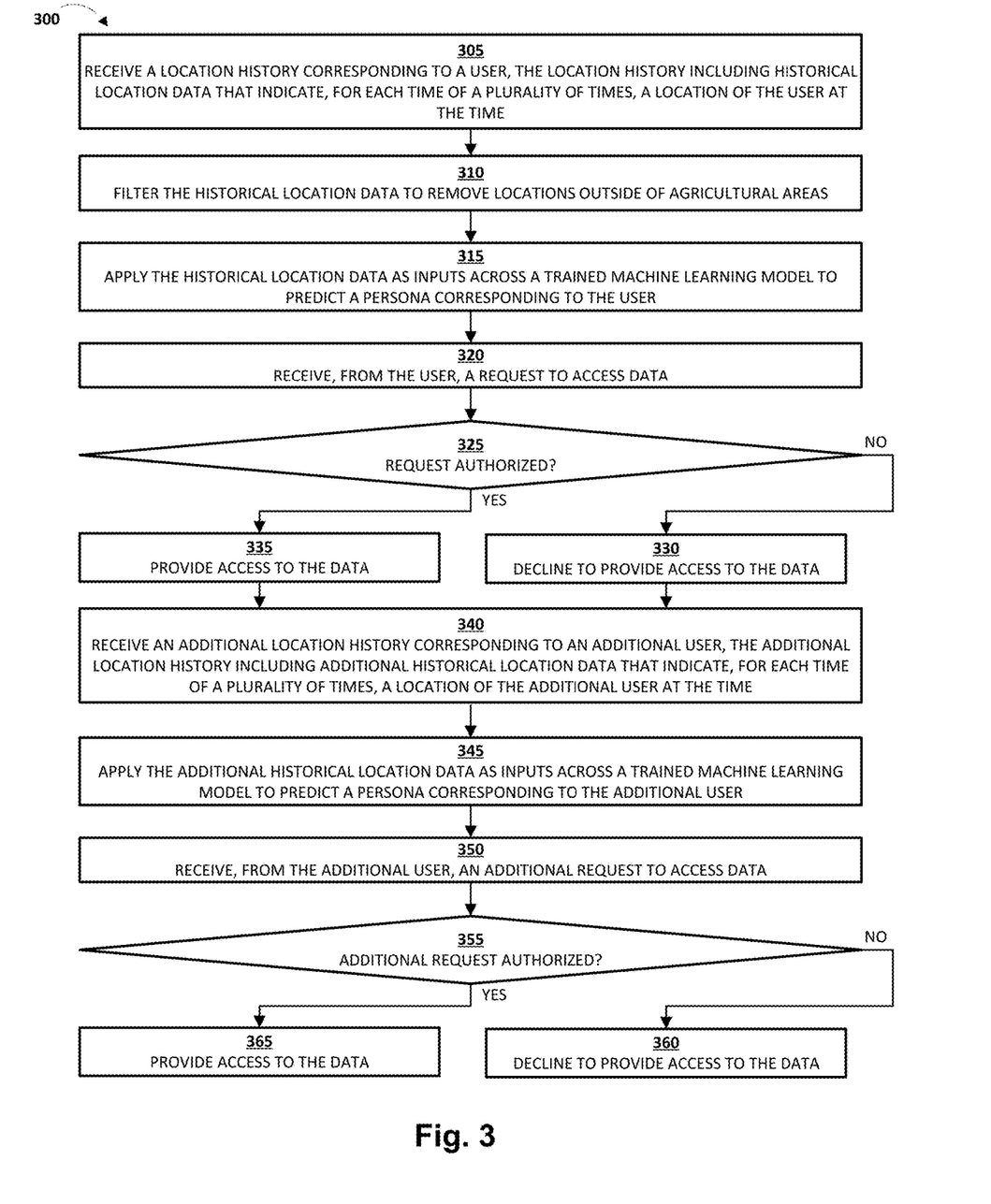
FIG. 3 depicts a flowchart illustrating an example method for practicing selected aspects of the present disclosure.

FIG. 3 is a flowchart illustrating an example method 300 of determining whether a particular user is authorized to access data, corresponding to a particular field, in a farmland database, in accordance with implementations disclosed herein. For convenience, the operations of the flowchart are described with reference to a system that performs the operations. This system may include various components of various computer systems, such as one or more components of the client devices 106 and/or the farmland knowledge system 104. Moreover, while operations of method 300 are shown in a particular order, this is not meant to be limiting. One or more operations may be reordered, omitted, or added.

At block 305, the system may receive a location history corresponding to a user, the location history including historical location data that indicate, for each time of a plurality of times, a location of the user at the time. In implementations, at block 305, the data gathering module 120 of the farmland knowledge system 104 may be configured to gather, collect, request, obtain, and/or retrieve location history data corresponding to one or more users. The location history data may be received from one or more client devices 106 and may include historical location data that indicate, for each time of a plurality of times (e.g., covering a multi-year period), a location (e.g., global positioning system or GPS location) of the user of the corresponding client device 106 at the time.

At block 310, the system may filter the historical location data received at block 305 to remove locations outside of agricultural areas. In implementations, at block 305, the historical location data received by the data gathering module 120 of the farmland knowledge system 104 from one or more client devices 106 may include locations within agricultural areas as well as locations outside of agricultural areas. The data gathering module 120 may be configured to filter the historical location data received at block 305 to remove (e.g., discard or obfuscate) the received information about the locations outside of agricultural areas.

Still referring to block 310, in an example, a location may be determined to be within or outside of agricultural areas by determining whether or not a GPS position of a location falls inside of or outside of predefined agricultural regions (e.g., defined based upon GPS boundaries). Other techniques may also be used to determine whether a location is within or outside of agricultural areas. For example, machine learning techniques may be used to predict whether a location falls inside of or outside of predefined agricultural regions based on satellite imagery.

In other implementations, all of the locations in the historical location data received from the one or more client devices 106 at block 305 may be locations that are within agricultural areas. For example, AMS 107 on client device 106 may automatically filter the historical location data to remove locations that are determined to be outside of agricultural areas (e.g., using the techniques described above or any other techniques) prior to providing the historical location data to the farmland knowledge system 104 at block 305.

Additionally or alternatively, in some implementations, prior to providing the historical location data to the farmland knowledge system 104 at block 305, AMS 107 on client device 106 may cause a map or other representation showing the historical location data to be displayed on the GUI rendered by AMS 107. In the case where AMS 107 on client device 106 automatically filters the historical location data, the map may indicate filtered location data from a predetermined, dynamically determined, or user-selected time period that will not be provided to the farmland knowledge system 104 at block 305 and/or may indicate the location data from a predetermined, dynamically determined, or user-selected time period that will be provided to the farmland knowledge system 104 at block 305. In the case where AMS 107 on client device 106 does not automatically filter the historical location data, the map may depict all historical location data from a predetermined, dynamically determined, or user-selected time period that will be provided to the farmland knowledge system 104 at block 305.

AMS 107 may provide, in the user interface, an option for the user to modify (or, in the case where AMS 107 does not automatically filter the historical location data, an option to specify) the location data that is to be filtered such that particular items of location data (e.g., particular GPS coordinates) will not be provided to the farmland knowledge system 104 at block 305 and/or to modify (or, in the case where AMS 107 does not automatically filter the historical location data, an option to specify) the location data that will be provided to the farmland knowledge system 104 at block 305. For example, AMS 107 may provide a UI in which the user is able to trace or adjust boundaries on the map to indicate non-agricultural areas or other areas for which location data should not be provided to the farmland knowledge system 104 at block 305 and/or to trace or adjust boundaries on the map to indicate agricultural areas or other areas for which location data should be provided to the farmland knowledge system 104 at block 305. The UI may provide for other ways of selecting location data to exclude/include from the set of location data to be provided to the farmland knowledge system 104 at block 305.

AMS 107 on the client device 106 may cause a prompt to be presented on the UI, requesting that the user accept or deny the request to provide, to the farmland knowledge system 104, the location history corresponding to the user. In response to the user accepting the request to provide the location history, AMS 107 on the client device 106 may provide the location history corresponding to the user to the farmland knowledge system 104. In response to the user denying the request to provide the location history, AMS 107 on the client device 106 may avoid providing the location history corresponding to the user to the farmland knowledge system 104.

At block 315, the system may apply the historical location data received at block 305 and filtered at block 310 as inputs across a trained machine learning model to predict a persona corresponding to the user. In implementations, at block 315, the access authorization module 124 applies the historical location data received and filtered by the data gathering module 120 of the farmland knowledge system 104 as inputs across a trained machine learning model to generate output that is indicative, for instance, of a predicted persona (e.g., farm owner, tenant, sprayer, crop advisor, etc.) of a user. Other data, such as frequency of visits and focus of visits, may also be applied as inputs across the trained machine learning model. The access authorization module 124 may determine the predicted persona of the user with respect to a particular area of farmland. For example, the user may be determined to be a tenant with respect to a particular area of farmland, based on an output of the trained machine learning model. In this manner, authentication of a user's role as an owner or tenant of a field may be based on proof-of-work (e.g., repeated, long-duration visits to agricultural fields over a multi-year period).

Still referring to block 315, in other implementations, other heuristics or algorithms may be used to determine a persona based on the historical location data received at block 305 and filtered at block 310. For example, other heuristics or algorithms may be used to determine whether the user has spent sufficient time working in selected field (e.g., operating a tractor, combine, scouting, etc.) to be a likely owner or tenant.

At block 320, the system may receive, from the user, a request to access data. In implementations, at block 320, the access authorization module 124 receives, from AMS 107 on the client device 106, a request to access data in the farmland knowledge system 104. The request to access data may be a request to store, edit, and/or retrieve various information about farmland (e.g., a field in a farmland database), including field boundaries, climate, soil composition, prevalence of plant disease (e.g., pests, fungus, etc.) and/or weeds in the area, and/or any other characteristics, maintained in the farmland knowledge system 104.

At block 325, in response to receiving the request to access the data at block 320, the system may determine whether or not the request is authorized based on the predicted persona corresponding to the user, determined at block 315. In implementations, at block 325, the access authorization module 124 determines whether or not the request is authorized based on the predicted persona corresponding to the user with respect to a particular area of farmland (e.g., a field) that is associated with the request.

Still referring to block 325, in an example, if a predicted persona of the user is a tenant or an owner with respect to a particular area of farmland (e.g., a field), the access authorization module 124 may determine that a request to access (e.g., edit) data associated with the particular area of farmland is authorized. If a predicted persona of the user is a sprayer with respect to a particular area of farmland, the access authorization module 124 may determine that a request to access data associated with the particular area of farmland is not authorized. Furthermore, if a predicted persona of the user is a crop advisor with respect to a particular area of farmland, the access authorization module 124 may determine that a request to access certain data (e.g., data associated with a job function of a crop advisor) associated with the particular area of farmland is authorized, and a request to access other data (e.g., data that is not associated with a job function of a crop advisor) associated with the particular area of farmland is not authorized.

Still referring to block 325, if the access authorization module 124 determines that the request to access data associated with the particular area of farmland is not authorized (i.e., the request is denied), then the flow proceeds to block 330. On the other hand, if the access authorization module 124 determines that the request to access data associated with the particular area of farmland is authorized, then the flow proceeds to block 335.

At block 330, in response to determining that the request is not authorized based on the predicted persona corresponding to the user at block 325, the system declines to provide access to the data. In implementations, at block 330, the access authorization module 124 declines the request, received at block 320 from AMS 107 of client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104.

At block 335, in response to determining that the request is authorized based on the predicted persona corresponding to the user at block 325, the system provides access to the data. In implementations, at block 335, the access authorization module 124 processes the request, received at block 320 from AMS 107 of the client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104, and provides a result or response to the request to AMS 107 of the client device 106.

At block 340, the system may receive an additional location history corresponding to an additional user, the additional location history including additional historical location data that indicate, for each time of a plurality of times, a location of the additional user at the time. In implementations, at block 340, the data gathering module 120 of the farmland knowledge system 104 may be configured to gather, collect, request, obtain, and/or retrieve additional location history data corresponding to the additional user. The additional location history data may be received from a client device 106 and may include historical location data that indicate, for each time of a plurality of times (e.g., covering a multi-year period), a location (e.g., global positioning system or GPS location) of the additional user at the time.

In some implementations, at block 340, after receiving the additional location history including the additional historical location data, the system may filter the additional historical location data to remove locations outside of agricultural areas. The additional historical location data received by the data gathering module 120 of the farmland knowledge system 104 the client device 106 may include locations within agricultural areas as well as locations outside of agricultural areas. The data gathering module 120 may be configured to filter the additional historical location data to remove (e.g., discard or obfuscate) the received information about the locations outside of agricultural areas.

In other implementations, all of the locations in the additional historical location data received from the client device 106 at block 340 may be locations that are within agricultural areas. For example, AMS 107 on client device 106 may automatically filter the additional historical location data to remove locations that are determined to be outside of agricultural areas prior to providing the additional historical location data to the farmland knowledge system 104 at block 340.

Additionally or alternatively, in some implementations, prior to providing the additional historical location data to the farmland knowledge system 104 at block 340, AMS 107 on client device 106 may cause a map or other representation showing the additional historical location data to be displayed on the GUI rendered by AMS 107. In the case where AMS 107 on client device 106 automatically filters the additional historical location data, the map may indicate filtered location data from a predetermined, dynamically determined, or user-selected time period that will not be provided to the farmland knowledge system 104 and/or may indicate the location data from a predetermined, dynamically determined, or user-selected time period that will be provided to the farmland knowledge system 104. In the case where AMS 107 on client device 106 does not automatically filter the additional historical location data, the map may depict all additional historical location data from a predetermined, dynamically determined, or user-selected time period that will be provided to the farmland knowledge system 104.

AMS 107 may provide, in the user interface, an option for the additional user to modify (or, in the case where AMS 107 does not automatically filter the historical location data, an option to specify) the additional location data that is to be filtered such that particular items of additional location data (e.g., particular GPS coordinates) will not be provided to the farmland knowledge system 104 and/or to modify (or, in the case where AMS 107 does not automatically filter the additional historical location data, an option to specify) the additional location data that will be provided to the farmland knowledge system 104. For example, AMS 107 may provide a UI in which the additional user is able to trace or adjust boundaries on the map to indicate non-agricultural areas or other areas for which additional location data should not be provided to the farmland knowledge system 104 and/or to trace or adjust boundaries on the map to indicate agricultural areas or other areas for which additional location data should be provided to the farmland knowledge system 104 at block 340. The UI may provide for other ways of selecting location data to exclude/include from the set of location data to be provided to the farmland knowledge system 104.

AMS 107 on the client device 106 may cause a prompt to be presented on the UI, requesting that the additional user accept or deny the request to provide, to the farmland knowledge system 104, the additional location history corresponding to the additional user. In response to the additional user accepting the request to provide the additional location history, AMS 107 on the client device 106 may provide the additional location history corresponding to the additional user to the farmland knowledge system 104. In response to the additional user denying the request to provide the additional location history, AMS 107 on the client device 106 may avoid providing the additional location history corresponding to the additional user to the farmland knowledge system 104.

At block 345, the system may apply the additional historical location data received at block 340 as the inputs across the trained machine learning model to predict a persona corresponding to the additional user. In implementations, at block 345, the access authorization module 124 applies the additional historical location data received by the data gathering module 120 of the farmland knowledge system 104 as inputs across the trained machine learning model to generate output that is indicative, for instance, of a predicted persona (e.g., farm owner, tenant, sprayer, crop advisor, etc.) of the additional user. The access authorization module 124 may determine the predicted persona of the additional user with respect to a particular area of farmland. For example, the additional user may be determined to a be tenant with respect to a particular area of farmland, based on an output of the trained machine learning model. In this manner, authentication of an additional user's role as an owner or tenant of a field may be based on proof-of-work (e.g., repeated, long-duration visits to agricultural fields over a multi-year period).

Still referring to block 345, in other implementations, other heuristics or algorithms may be used to determine a persona based on the historical location data received at block 340. For example, other heuristics or algorithms may be used to determine whether the additional user has spent sufficient time working in selected field (e.g., operating a tractor, combine, scouting, etc.) to be a likely owner or tenant.

At block 350, the system may receive, from the additional user, an additional request to access the data. In implementations, at block 350, the access authorization module 124 receives, from AMS 107 on the client device 106, an additional request to access data in the farmland knowledge system 104. The additional request to access data may be a request to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104.

At block 355, in response to receiving the additional request to access the data at block 350, the system may determine whether or not the additional request is authorized based on the predicted persona corresponding to the additional user, determined at block 345. In implementations, at block 355, the access authorization module 124 determines whether or not the additional request is authorized based on the predicted persona corresponding to the additional user with respect to a particular area of farmland that is associated with the request.

Still referring to block 355, in an example, if a predicted persona of the additional user is a tenant or an owner with respect to a particular area of farmland, the access authorization module 124 may determine that an additional request to access data associated with the particular area of farmland is authorized. If a predicted persona of the additional user is a sprayer with respect to a particular area of farmland, the access authorization module 124 may determine that an additional request to access data associated with the particular area of farmland is not authorized. Furthermore, if a predicted persona of the additional user is a crop advisor with respect to a particular area of farmland, the access authorization module 124 may determine that an additional request to access certain data (e.g., data associated with a job function of a crop advisor) associated with the particular area of farmland is authorized, and an additional request to access other data (e.g., data that is not associated with a job function of a crop advisor) associated with the particular area of farmland is not authorized.

Still referring to block 355, if the access authorization module 124 determines that the additional request to access data associated with the particular area of farmland is not authorized (i.e., the additional request is denied), then the flow proceeds to block 360. On the other hand, if the access authorization module 124 determines that the additional request to access data associated with the particular area of farmland is authorized, then the flow proceeds to block 365.

At block 360, in response to determining that the additional request is not authorized based on the predicted persona corresponding to the additional user at block 355, the system declines to provide access to the data. In implementations, at block 360, the access authorization module 124 declines the additional request, received at block 350 from AMS 107 of client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104.

At block 365, in response to determining that the additional request is authorized based on the predicted persona corresponding to the additional user at block 355, the system provides access to the data. In implementations, at block 365, the access authorization module 124 processes the additional request, received at block 350 from AMS 107 of the client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104, and provides a result or response to the additional request to AMS 107 of the client device 106.

Figure 4:
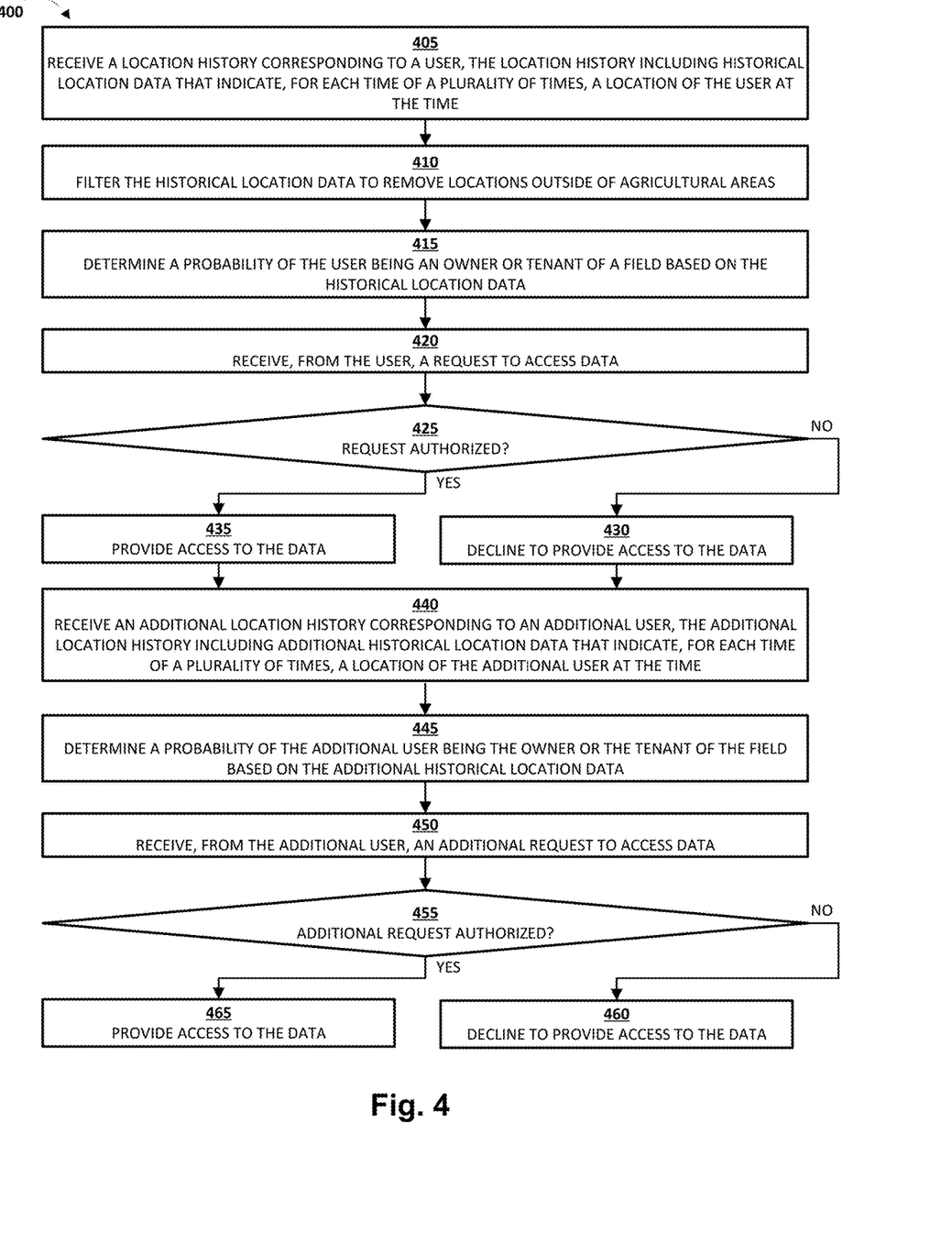
FIG. 4 depicts another flowchart illustrating an example method for practicing selected aspects of the present disclosure.

FIG. 4 is a flowchart illustrating an example method 400 of determining whether a particular user is authorized to access data, corresponding to a particular field, in a farmland database, in accordance with implementations disclosed herein. For convenience, the operations of the flowchart are described with reference to a system that performs the operations. This system may include various components of various computer systems, such as one or more components of the client devices 106 and/or the farmland knowledge system 104. Moreover, while operations of method 400 are shown in a particular order, this is not meant to be limiting. One or more operations may be reordered, omitted, or added.

At block 405, the system may receive a location history corresponding to a user, the location history including historical location data that indicate, for each time of a plurality of times, a location of the user at the time. In implementations, at block 405, the data gathering module 120 of the farmland knowledge system 104 may be configured to gather, collect, request, obtain, and/or retrieve location history data corresponding to one or more users. The location history data may be received from one or more client devices 106 and may include historical location data that indicate, for each time of a plurality of times (e.g., covering a multi-year period), a location (e.g., global positioning system or GPS location) of the user of the corresponding client device 106 at the time.

At block 410, the system may filter the historical location data received at block 405 to remove locations outside of agricultural areas. In implementations, at block 405, the historical location data received by the data gathering module 120 of the farmland knowledge system 104 from one or more client devices 106 may include locations within agricultural areas as well as locations outside of agricultural areas. The data gathering module 120 may be configured to filter the historical location data received at block 405 to remove (e.g., discard or obfuscate) the received information about the locations outside of agricultural areas.

Still referring to block 410, in an example, a location may be determined to be within or outside of agricultural areas by determining whether or not a GPS position of a location falls inside of or outside of predefined agricultural regions (e.g., defined based upon GPS boundaries). Other techniques may also be used to determine whether a location is within or outside of agricultural areas. For example, machine learning techniques may be used to predict whether a location falls inside of or outside of predefined agricultural regions based on satellite imagery.

In other implementations, all of the locations in the historical location data received from the one or more client devices 106 at block 405 may be locations that are within agricultural areas. For example, AMS 107 on client device 106 may automatically filter the historical location data to remove locations that are determined to be outside of agricultural areas (e.g., using the techniques described above or any other techniques) prior to providing the historical location data to the farmland knowledge system 104 at block 405.

Additionally or alternatively, in some implementations, prior to providing the historical location data to the farmland knowledge system 104 at block 405, AMS 107 on client device 106 may cause a map or other representation showing the historical location data to be displayed on the GUI rendered by AMS 107. In the case where AMS 107 on client device 106 automatically filters the historical location data, the map may indicate filtered location data from a predetermined, dynamically determined, or user-selected time period that will not be provided to the farmland knowledge system 104 at block 405 and/or may indicate the location data from a predetermined, dynamically determined, or user-selected time period that will be provided to the farmland knowledge system 104 at block 405. In the case where AMS 107 on client device 106 does not automatically filter the historical location data, the map may depict all historical location data from a predetermined, dynamically determined, or user-selected time period that will be provided to the farmland knowledge system 104 at block 405.

AMS 107 may provide, in the user interface, an option for the user to modify (or, in the case where AMS 107 does not automatically filter the historical location data, an option to specify) the location data that is to be filtered such that particular items of location data (e.g., particular GPS coordinates) will not be provided to the farmland knowledge system 104 at block 405 and/or to modify (or, in the case where AMS 107 does not automatically filter the historical location data, an option to specify) the location data that will be provided to the farmland knowledge system 104 at block 405. For example, AMS 107 may provide a UI in which the user is able to trace or adjust boundaries on the map to indicate non-agricultural areas or other areas for which location data should not be provided to the farmland knowledge system 104 at block 405 and/or to trace or adjust boundaries on the map to indicate agricultural areas or other areas for which location data should be provided to the farmland knowledge system 104 at block 405. The UI may provide for other ways of selecting location data to exclude/include from the set of location data to be provided to the farmland knowledge system 104 at block 405.

AMS 107 on the client device 106 may cause a prompt to be presented on the UI, requesting that the user accept or deny the request to provide, to the farmland knowledge system 104, the location history corresponding to the user. In response to the user accepting the request to provide the location history, AMS 107 on the client device 106 may provide the location history corresponding to the user to the farmland knowledge system 104. In response to the user denying the request to provide the location history, AMS 107 on the client device 106 may avoid providing the location history corresponding to the user to the farmland knowledge system 104.

At block 415, the system may determine a probability of the user being an owner or tenant of a field based on the historical location data received at block 405 and filtered at block 410. In implementations, at block 415, the access authorization module 124 may apply the historical location data received and filtered by the data gathering module 120 of the farmland knowledge system 104 as inputs across a trained machine learning model to generate output that is indicative, for instance, of a probability of the user being an owner or tenant of a field. In this manner, authentication of a user's role as an owner or tenant of a field may be based on proof-of-work (e.g., repeated, long-duration visits to agricultural fields over a multi-year period).

Still referring to block 415, in other implementations, other heuristics or algorithms may be used to determine a probability of the user being an owner or tenant of a field based on the historical location data received at block 405 and filtered at block 410. For example, other heuristics or algorithms may be used to determine a probability of the user being an owner or tenant of a field based on time spent working in a selected field (e.g., operating a tractor, combine, scouting, etc.).

At block 420, the system may receive, from the user, a request to access data. In implementations, at block 420, the access authorization module 124 receives, from AMS 107 on the client device 106, a request to access data in the farmland knowledge system 104. The request to access data may be a request to store, edit, and/or retrieve various information about farmland (e.g., a field in a farmland database), including field boundaries, climate, soil composition, prevalence of plant disease (e.g., pests, fungus, etc.) and/or weeds in the area, and/or any other characteristics, maintained in the farmland knowledge system 104.

At block 425, in response to receiving the request to access the data at block 420, the system may determine whether or not the request is authorized based on whether or not the probability of the user being the owner or the tenant, determined at block 415, satisfies a threshold. In implementations, at block 425, the access authorization module 124 determines whether or not the request is authorized based on whether or not the probability of the user being the owner or the tenant with respect to a particular area of farmland (e.g., a field) that is associated with the request satisfies the threshold.

Still referring to block 425, if the access authorization module 124 determines that the probability of the user being the owner or the tenant with respect to a particular area of farmland does not satisfy the threshold, then the request to access data associated with the particular area of farmland is not authorized (i.e., the request is denied) and the flow proceeds to block 430. On the other hand, if the access authorization module 124 determines that the probability of the user being the owner or the tenant with respect to a particular area of farmland satisfies the threshold, then the request to access data associated with the particular area of farmland is authorized and the flow proceeds to block 435.

At block 430, in response to determining that the request is not authorized based on the probability of the user being the owner or the tenant with respect to a particular area of farmland not satisfying the threshold, the system declines to provide access to the data. In implementations, at block 430, the access authorization module 124 declines the request, received at block 420 from AMS 107 of client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104.

At block 435, in response to determining that the request is authorized based on the probability of the user being the owner or the tenant with respect to a particular area of farmland satisfying the threshold, the system provides access to the data. In implementations, at block 435, the access authorization module 124 processes the request, received at block 420 from AMS 107 of the client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104, and provides a result or response to the request to AMS 107 of the client device 106.

At block 440, the system may receive an additional location history corresponding to an additional user, the additional location history including additional historical location data that indicate, for each time of a plurality of times, a location of the additional user at the time. In implementations, at block 440, the data gathering module 120 of the farmland knowledge system 104 may be configured to gather, collect, request, obtain, and/or retrieve additional location history data corresponding to the additional user. The additional location history data may be received from a client device 106 and may include historical location data that indicate, for each time of a plurality of times (e.g., covering a multi-year period), a location (e.g., global positioning system or GPS location) of the additional user at the time.

In some implementations, at block 440, after receiving the additional location history including the additional historical location data, the system may filter the additional historical location data to remove locations outside of agricultural areas. The additional historical location data received by the data gathering module 120 of the farmland knowledge system 104 the client device 106 may include locations within agricultural areas as well as locations outside of agricultural areas. The data gathering module 120 may be configured to filter the additional historical location data to remove (e.g., discard or obfuscate) the received information about the locations outside of agricultural areas.

In other implementations, all of the locations in the additional historical location data received from the client device 106 at block 440 may be locations that are within agricultural areas. For example, AMS 107 on client device 106 may automatically filter the additional historical location data to remove locations that are determined to be outside of agricultural areas prior to providing the additional historical location data to the farmland knowledge system 104 at block 440.

Additionally or alternatively, in some implementations, prior to providing the additional historical location data to the farmland knowledge system 104 at block 440, AMS 107 on client device 106 may cause a map or other representation showing the additional historical location data to be displayed on the GUI rendered by AMS 107. In the case where AMS 107 on client device 106 automatically filters the additional historical location data, the map may indicate filtered location data from a predetermined, dynamically determined, or user-selected time period that will not be provided to the farmland knowledge system 104 and/or may indicate the location data from a predetermined, dynamically determined, or user-selected time period that will be provided to the farmland knowledge system 104. In the case where AMS 107 on client device 106 does not automatically filter the additional historical location data, the map may depict all additional historical location data from a predetermined, dynamically determined, or user-selected time period that will be provided to the farmland knowledge system 104.

AMS 107 may provide, in the user interface, an option for the additional user to modify (or, in the case where AMS 107 does not automatically filter the historical location data, an option to specify) the additional location data that is to be filtered such that particular items of additional location data (e.g., particular GPS coordinates) will not be provided to the farmland knowledge system 104 and/or to modify (or, in the case where AMS 107 does not automatically filter the additional historical location data, an option to specify) the additional location data that will be provided to the farmland knowledge system 104. For example, AMS 107 may provide a UI in which the additional user is able to trace or adjust boundaries on the map to indicate non-agricultural areas or other areas for which additional location data should not be provided to the farmland knowledge system 104 and/or to trace or adjust boundaries on the map to indicate agricultural areas or other areas for which additional location data should be provided to the farmland knowledge system 104 at block 440. The UI may provide for other ways of selecting location data to exclude/include from the set of location data to be provided to the farmland knowledge system 104.

AMS 107 on the client device 106 may cause a prompt to be presented on the UI, requesting that the additional user accept or deny the request to provide, to the farmland knowledge system 104, the additional location history corresponding to the additional user. In response to the additional user accepting the request to provide the additional location history, AMS 107 on the client device 106 may provide the additional location history corresponding to the additional user to the farmland knowledge system 104. In response to the additional user denying the request to provide the additional location history, AMS 107 on the client device 106 may avoid providing the additional location history corresponding to the additional user to the farmland knowledge system 104.

At block 445, the system may determine a probability of the additional user being the owner or the tenant of the field based on the additional historical location data received at block 440. In implementations, at block 445, the access authorization module 124 may apply the historical location data received and filtered by the data gathering module 120 of the farmland knowledge system 104 as inputs across a trained machine learning model to generate output that is indicative, for instance, of a probability of the user being an owner or tenant of a field. In this manner, authentication of an additional user's role as an owner or tenant of a field may be based on proof-of-work (e.g., repeated, long-duration visits to agricultural fields over a multi-year period).

Still referring to block 445, in other implementations, other heuristics or algorithms may be used to determine a probability of the additional user being the owner or the tenant of the field based on the additional historical location data received at block 440. For example, other heuristics or algorithms may be used to determine a probability of the additional user being the owner or the tenant of the field based on time spent working in selected field (e.g., operating a tractor, combine, scouting, etc.).

At block 450, the system may receive, from the additional user, an additional request to access the data. In implementations, at block 450, the access authorization module 124 receives, from AMS 107 on the client device 106, an additional request to access data in the farmland knowledge system 104. The additional request to access data may be a request to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104.

At block 455, in response to receiving the additional request to access the data at block 450, the system may determine whether or not the additional request is authorized based on whether or not the probability of the additional user being the owner or the tenant, determined at block 445, satisfies the threshold. In implementations, at block 455, the access authorization module 124 determines whether or not the additional request is authorized based on whether or not the probability of the additional user being the owner or the tenant with respect to a particular area of farmland (e.g., a field) that is associated with the additional request satisfies the threshold.

Still referring to block 455, if the access authorization module 124 determines that the probability of the additional user being the owner or the tenant with respect to a particular area of farmland does not satisfy the threshold, then the additional request to access data associated with the particular area of farmland is not authorized (i.e., the additional request is denied) and the flow proceeds to block 460. On the other hand, if the access authorization module 124 determines that the probability of the additional user being the owner or the tenant with respect to a particular area of farmland satisfies the threshold, then the additional request to access data associated with the particular area of farmland is authorized and the flow proceeds to block 465.

At block 460, in response to determining that the additional request is not authorized based on the probability of the additional user being the owner or the tenant with respect to a particular area of farmland not satisfying the threshold, the system declines to provide access to the data. In implementations, at block 460, the access authorization module 124 declines the additional request, received at block 450 from AMS 107 of client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104.

At block 465, in response to determining that the additional request is authorized based on the probability of the additional user being the owner or the tenant with respect to a particular area of farmland satisfying the threshold, the system provides access to the data. In implementations, at block 465, the access authorization module 124 processes the additional request, received at block 450 from AMS 107 of the client device 106, to store, edit, and/or retrieve various information about farmland, including field boundaries, climate, soil composition, prevalence of plant disease (e.g., pests, fungus, etc.) and/or weeds in the area, and/or any other characteristics, maintained in the farmland knowledge system 104, and provides a result or response to the additional request to AMS 107 of the client device 106.

Figure 5:
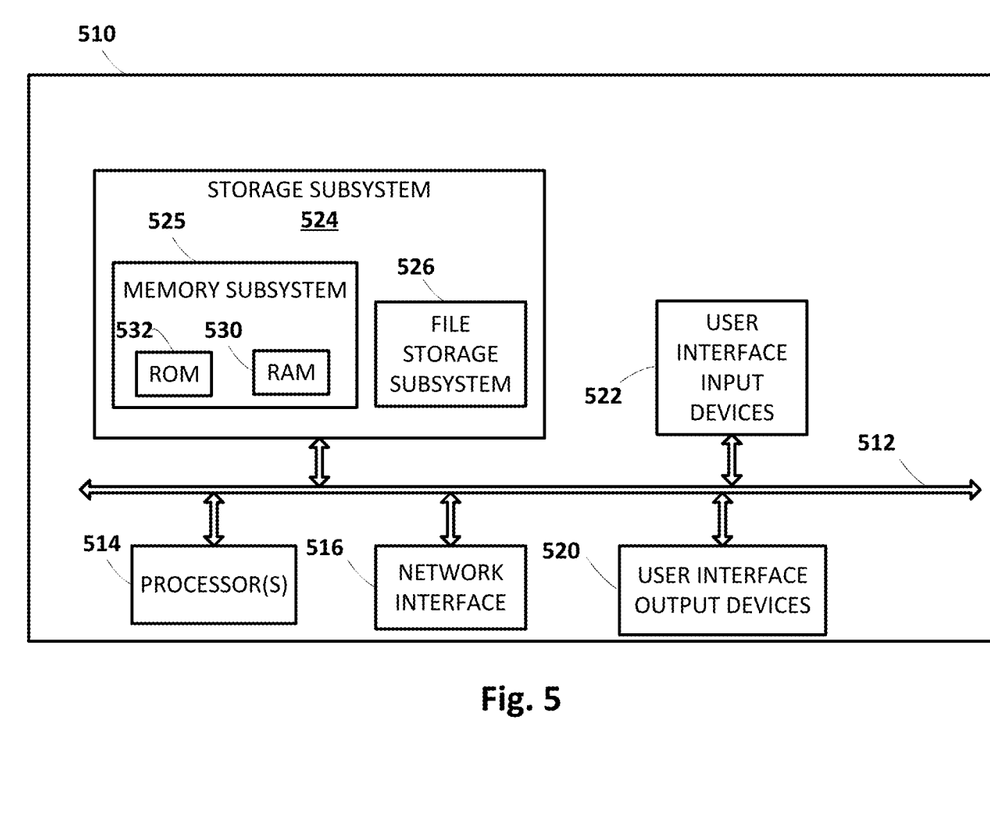
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 3 and 4, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving a location history corresponding to a user, the location history including historical location data that indicate, for each time of a plurality of times, a location of the user at the time;
   applying the historical location data as inputs across a trained machine learning model to predict a role of the user that corresponds to an agricultural area;
   receiving, from the user, a request to access data;
   in response to receiving the request to access the data, determining that the request is authorized based on the predicted role; and
   in response to determining that the request is authorized, providing access to the data.

2. The method according to claim 1, wherein all of the locations in the historical location data are within agricultural areas.

3. The method according to claim 1, further including filtering the historical location data to remove locations outside of agricultural areas prior to applying the historical location data as inputs across the trained machine learning model.

4. The method according to claim 1, wherein the role of the user is an owner, tenant, sprayer, or crop adviser, of the agricultural area.

5. The method according to claim 4, wherein the request to access data includes a request to edit data corresponding to the agricultural area in a farmland database.

6. The method according to claim 1, further including:
   receiving an additional location history corresponding to an additional user, the additional location history including additional historical location data that indicate, for each time of a plurality of times, a location of the additional user at the time; and
   applying the additional historical location data as the inputs across the trained machine learning model to predict a role of the additional user.

7. The method according to claim 6, further including:
   receiving, from the additional user, an additional request to access the data;
   in response to receiving the additional request to access the data, determining that the additional request is denied based on the role of the additional user; and
   in response to determining that the additional request is denied, declining to provide access to the data.

8. A computer program product comprising one or more non-transitory computer-readable storage media having program instructions collectively stored on the one or more computer-readable storage media, the program instructions executable to:
   receive a location history corresponding to a user, the location history including historical location data that indicate, for each time of a plurality of times, a location of the user at the time;
   determine, using a machine learning model, a probability of the user being an owner or a tenant of a agricultural area based on the historical location data;
   receive, from the user, a request to access data;
   in response to receiving the request to access the data, determine that the request is authorized based on the probability of the user being the owner or the tenant satisfying a threshold; and
   in response to determining that the request is authorized, provide access to the data.

9. The computer program product according to claim 8, wherein all of the locations in the historical location data are within agricultural areas.

10. The computer program product according to claim 8, the program instructions further being executable to filter the historical location data to remove locations outside of agricultural areas prior to determining the probability of the user being the owner or the tenant of the agricultural area based on the historical location data.

11. The computer program product according to claim 8, wherein the request to access data includes a request to edit data corresponding to the agricultural area in a farmland database.

12. The computer program product according to claim 8, the program instructions further being executable to:
   receive an additional location history corresponding to an additional user, the additional location history including additional historical location data that indicate, for each time of a plurality of times, a location of the additional user at the time; and
   determine a probability of the additional user being the owner or the tenant of the agricultural area based on the additional historical location data.

13. The computer program product according to claim 12, the program instructions further being executable to:
   receive, from the additional user, an additional request to access the data; and in response to receiving the additional request to access the data, determine that the additional request is denied based on the probability of the additional user being the owner or the tenant not satisfying the threshold.

14. A system comprising:
a processor, a computer-readable memory, one or more computer-readable storage media, and program instructions collectively stored on the one or more computer-readable storage media, the program instructions executable to:
receive a location history corresponding to a user, the location history including historical location data that indicate, for each time of a plurality of times, a location of the user at the time;
apply the historical location data as inputs across a trained machine learning model to predict a role of the user that corresponds to an agricultural area;
receive, from the user, a request to access data;
in response to receiving the request to access the data, determine that the request is authorized based on the predicted role; and
in response to determining that the request is authorized, provide access to the data.

15. The system according to claim 14, wherein all of the locations in the historical location data are within agricultural areas.

16. The system according to claim 14, the program instructions further being executable to filter the historical location data to remove locations outside of agricultural areas prior to applying the historical location data as inputs across the trained machine learning model.

17. The system according to claim 14, wherein the role of the user is an owner, tenant, sprayer, or crop advisor, of the agricultural area.

18. The system according to claim 17, wherein the request to access data includes a request to edit data corresponding to the agricultural area in a farmland database.

19. The system according to claim 14, the program instructions further being executable to:
receive an additional location history corresponding to an additional user, the additional location history including additional historical location data that indicate, for each time of a plurality of times, a location of the additional user at the time; and
apply the additional historical location data as the inputs across the trained machine learning model to predict a role of the additional user.

20. The system according to claim 19, the program instructions further being executable to:
receive, from the additional user, an additional request to access the data in response to receiving the additional request to access the data, determine that the additional request is denied based on the predicted role of the additional user; and
in response to determining that the additional request is denied, decline to provide access to the data.

21. The method according to claim 4, further including determining the request is authorized in response to predicting the role is the owner or the tenant of the agricultural area.

22. The system according to claim 17, the program instructions further being executable to determine the request is authorized in response to predicting the role is the owner or the tenant of the agricultural area.

* * * * *